United States Patent
Bosco et al.

(10) Patent No.: US 10,735,378 B1
(45) Date of Patent: Aug. 4, 2020

(54) SYSTEMS, DEVICES, AND METHODS FOR PROVIDING IMPROVED NETWORK SECURITY

(71) Applicant: VERISIGN, INC., Reston, VA (US)

(72) Inventors: John Bosco, Bluemont, VA (US); Kenneth Ryan, Vienna, VA (US); Dow Summers, Purcellville, VA (US)

(73) Assignee: VERISIGN, INC., Reston, VA (US)

(*) Notice: Subject to any disclaimer, the term of this patent is extended or adjusted under 35 U.S.C. 154(b) by 148 days.

(21) Appl. No.: 15/624,187

(22) Filed: Jun. 15, 2017

(51) Int. Cl.
*G06F 21/00* (2013.01)
*H04L 29/06* (2006.01)
*G06F 13/42* (2006.01)

(52) U.S. Cl.
CPC ...... *H04L 63/0245* (2013.01); *G06F 13/4282* (2013.01); *H04L 63/1416* (2013.01); *H04L 63/1458* (2013.01); *G06F 2213/0024* (2013.01)

(58) Field of Classification Search
CPC ... H04L 63/1416; H04L 43/028; H04L 63/00; H04L 63/0245; H04L 63/1425; H04L 63/1441; H04L 63/20
See application file for complete search history.

(56) References Cited

U.S. PATENT DOCUMENTS

| | | | | |
|---|---|---|---|---|
| 9,253,206 B1* | 2/2016 | Fleischman | ......... | H04L 63/1458 |
| 2013/0139245 A1* | 5/2013 | Thomas | ............. | H04L 63/0227 726/13 |
| 2018/0137139 A1* | 5/2018 | Bangalore | .......... | H04L 67/2842 |

* cited by examiner

*Primary Examiner* — Ghazal B Shehni
(74) *Attorney, Agent, or Firm* — MH2 Technology Law Group, LLP

(57) ABSTRACT

Embodiments relate to systems, computer readable media, devices, and computer-implemented methods for providing improved network security by receiving a network packet, applying a filter rule in a first instance of a distributed reputation database to the network packet, determining, using a network interface card with a field programmable gate array, to drop or modify the network packet based on the applying, and transmitting reputation data to a security control center that includes a second instance of the distributed reputation database, where the reputation data includes information corresponding to the network packet that was dropped or modified.

29 Claims, 8 Drawing Sheets

SYSTEMS, DEVICES, AND METHODS FOR PROVIDING IMPROVED NETWORK SECURITY

BACKGROUND

Network security systems are often employed to protect networks from, for example, misuse, unauthorized modification, malicious software, and/or denial-of-service (DOS) attacks (e.g., distributed denial-of-service (DDOS) attacks). For example, network security devices and applications can be deployed in network nodes that receive and forward network traffic to prevent or mitigate network security attacks by identifying and dropping network packets associated with an attack.

However, certain network nodes receive high levels of network traffic, and many network nodes may not have the processing capabilities to perform even a cursory analysis of each and every network packet that passes through the node to determine whether the network packet could constitute a threat without causing degraded performance of the node. Additionally, certain network nodes may perform other functions in addition to forwarding network traffic, such as thoroughly analyzing network packets, monitoring, recording, and reporting statistics associated with network traffic, creating and utilizing routing tables, and other functions. In such network nodes, the processing resources used to perform even a cursory analysis of each and every network packet may hinder or even prevent a network node from performing other functions such as these.

Therefore, systems, methods, and computer-readable media are desirable that can more efficiently provide network security on network nodes.

SUMMARY

The present disclosure relates to systems, computer-readable media, devices, and methods for providing improved network security by receiving a network packet, applying a filter rule in a first instance of a distributed reputation database to the network packet, determining to drop the network packet based on the applying, and transmitting reputation data to a security control center that includes a second instance of the distributed reputation database, where the reputation data includes information corresponding to the network packet that was dropped.

In some embodiments, the systems and devices can include and the methods can use a processor and a computer-readable medium included in a network interface card that includes a field programmable gate array.

In other embodiments, the first instance of the distributed reputation database can be stored in an accessory memory of the field programmable gate array.

In further embodiments, the network interface card can operate in a security plane of a system.

In some implementations, improved network security can be provided by receiving a second network packet, applying a filter rule in the first instance of the distributed reputation database to the second network packet, determining, in the security plane, to modify the second network packet based on the applying, modifying the second network packet, and forwarding the second network packet that was modified to an intended destination of the network packet.

In other implementations, improved network security can be provided by receiving a second network packet, applying a filter rule in the first instance of the distributed reputation database to the second network packet, determining, in the security plane, to forward the second network packet to an intended destination of the network packet based on the applying, and forwarding the second network packet to the intended destination.

In further implementations, the second packet can be sent to an application in a data plane of a system via a Peripheral Component Interconnect (PCI) bus.

In some embodiments, the second packet can be received from an application in a data plane of a system via a PCI bus.

In other embodiments, improved network security can be provided by incrementing a counter corresponding to a property of the network packet, where the reputation data transmitted to the security control center includes an indication of the counter.

In further embodiments, the applying can indicate that the network packet is associated with a denial-of-service attack.

In some implementations, improved network security can be provided by receiving a second network packet that includes second reputation data, where the second reputation data includes instructions to transmit the reputation data to the security control center, and the transmitting the reputation data is performed in response to the instructions.

In other implementations, improved network security can be provided by receiving a second network packet that includes second reputation data, where the second reputation data includes instructions to add a filter rule or delete a filter rule in the first instance of the distributed reputation database.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
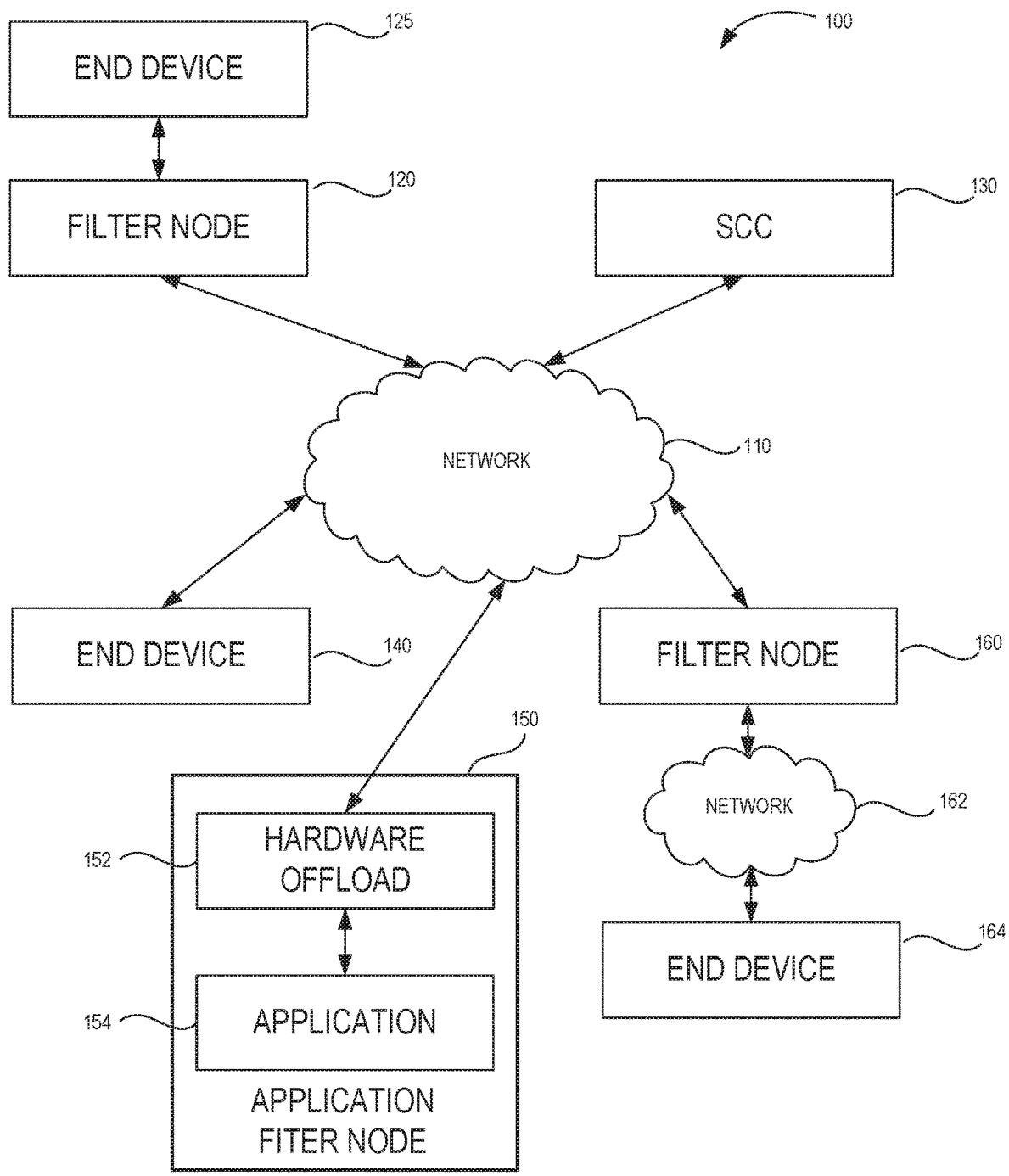
FIG. 1 is a diagram illustrating an example of a system for providing decentralized distributed security control, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

As disclosed herein, hardware offload devices, such as network interface cards (NICs) can be used to perform computations that are supplemental to those performed by the main processing components of a computing device. For example, a NIC can include a field programmable gate array (FPGA) or the like that can be used to perform the supplemental computations, such as incrementing counters, updating a reputation database, comparing a received network packet to a reputation database to determine whether the network packet could represent a threat, and the like, as disclosed in further detail below. This provides a new technical capability to the computing device that includes the NIC.

By offloading processing to the NIC, the main processing components of the computing device can allot more main processing resources to other functionality, such as a more thorough analysis of certain network packets, monitoring, recording, and reporting statistics associated with network traffic, creating and utilizing routing tables, etc. Additionally, in some embodiments, NICs may allow more available throughput than the main processing resources of some devices. Also, in further embodiments, offloading processing of network packets to NICs can allow the use of network packet filtering devices with simpler and/or cheaper processing hardware because the processing hardware may only be used to provide operating systems, interfaces, etc. for the filtering device and may not process the individual network packets. Accordingly, by offloading processing of network packets to NICs, the resulting network packet filtering device may cost less than a network packet filtering device that utilizes high-end processing hardware to allow the device to process individual packages using the main processing components, while providing the same or similar technical functionality.

Additionally, as disclosed herein, a distributed reputation database can be stored on multiple network nodes (e.g., stored in NICs with FPGA with accessory memory) on a network, such as the Internet, providing a new technical capability to the nodes. Individual nodes can use instances of the distributed reputation database to identify threats and can also identify new threats using, for example, a counter associated with one or more properties of network packets. New threats that are identified can be reported to other network nodes and/or to a centralized database, increasing security across the network.

Thus, by offloading processing to the NICs, network packet filtering devices can more efficiently filter packets and more network packet filtering devices can be placed within a network, increasing the efficiency and coverage of network packet monitoring, thereby improving the technical ability of the devices to identify and prevent threats.

The principals disclosed herein may refer to "network interface cards (NICs)" and/or "hardware offload devices." However, these terms are intended to be used interchangeably, and principles described with regard to NICs can also be applied to hardware offload devices, and vice versa, consistent with disclosed embodiments.

FIG. 1 is a diagram illustrating an example of a system 100 for providing decentralized distributed security control, consistent with certain disclosed embodiments. The system 100 can include a network 110, a filter node (FN) 120, an end device 125, a security control center (SCC) 130, an end device 140, an application filter node (AFN) 150 that includes a hardware offload device 152 and an application 154, a filter node 160, a network 162, and an end device 164.

In some implementations, the network 110 can represent one or more communication networks. For example, the network 110 can represent one or more wide area networks (e.g., the Internet), one or more local area networks, one or more telecommunications networks, and the like.

In other implementations, the network 162 can represent one or more communication networks. For example, the network 162 can represent one or more wide area networks (e.g., the Internet), one or more local area networks, one or more telecommunications networks, and the like.

In further embodiments, the SCC 130, can represent one or more computing devices. For example, the SCC 130 can represent one or more webservers, databases, mainframe devices, or other computing devices. In additional embodiments, the SCC 130 can be capable of receiving reputation data, which may be data received from another computing device that is used to update a reputation database, (e.g., instructions to create filter rules from higher-tier SCCs), storing reputation data in an instance of a distributed reputation database, receiving reported reputation data from other SCCs (e.g., lower-tier SCCs, FNs, or AFNs, etc.), transmitting reputation data to other devices (e.g., transmitting instructions to create filter rules to lower-tier SCCs, FNs, or AFNs, transmitting reported reputation data to higher-tier SCCs, etc.), and creating filter rules. In some implementations, the SCC 130 can represent a tier 1 SCC that can control lower-tier SCCs (e.g., tier 2, tier 3, etc.). In other implementations, the SCC 130 can represent a tier 2 SCC that control lower-tier SCCs (e.g., tier 3, etc.) and can receive instructions from higher tier SCCs (e.g., tier 1).

As used herein, a filter rule is a rule used by a computing device to determine how to handle a received packet. For example, a filter rule can be to drop packets that correspond to certain parameters, or to allow packets that correspond to certain parameters, etc.

In various embodiments described herein, reputation data sent from a higher-tier SCC to a lower-tier SCC, filter node, or application filter node can include, but is not limited to: instructions to add a filter rule to an FN or AFN, instructions to add a filter rule to an SCC, instructions to delete a filter rule from an FN or AFN, instructions to delete a filter rule from an SCC, instructions to send packet statistics to an SCC, instructions to send the top talkers (e.g., source addresses that correspond to more than a threshold percent of total traffic) to an SCC, instructions to send a complete connection table to an SCC, instructions to send a connection table entry to an SCC, instructions to send a black list entry or a white list entry to an SCC, and instructions to send an entire black list or white list to an SCC.

In additional embodiments described herein, reputation data sent from a lower-tier SCC, filter node, or application filter node to a higher-tier SCC can include, but are not limited to: packet statistics for a customer identifier (ID), packet statistics for an SCC ID, packet statistics for an FN or AFN ID, packet statistics for top talkers (e.g., where the top talkers are identified based on a source internet protocol (IP) address or a destination IP address), total packets per second, a number of flows (e.g., source and destination addresses of packets) in a connection table and a number of packets per second per flow, a number of L2 (i.e., data link layer) packets per second, a number of L3 (i.e., network layer) packets by protocol (e.g., User Datagram Protocol (UDP), Transmission Control Protocol (TCP), etc.) per second, a number of L7 (i.e., application layer) packets by application per second (e.g., Domain Name System (DNS), Hypertext Transfer Protocol (HTTP), etc.), a number of TCP synchronize (SYN) packets per second, an average time-to-live (TTL) size per second, a number of Internet Protocol version 4 (IPv4) packets per second, a number of Internet Protocol version 6 (IPv6) packets per second, an average packet size per second, a number of black list filter rules and number of packets per rule per second, a number of white list filter rules and number of packets per rule per second, packet counters, a total number of bytes, and bytes per second.

In some embodiments, the filter node 120 can represent one or more computing devices connected to the network 110. For example, the filter node 120 can represent one or more NICs, routers, webservers, databases, mainframe devices, or other computing devices. In additional embodiments, the filter node 120 can be capable of receiving reputation data (e.g., instructions to create filter rules), maintaining and updating an instance of a reputation database, receiving network traffic directed to one or more end devices (e.g., the end device 125 and/or the end device 140), maintaining counters associated with one or more packet properties, determining whether to drop (e.g., remove, delete, or otherwise cease to conventionally process) packets based on the reputation database, determining whether to modify packets, forwarding packets to end devices, and transmitting reputation data to one or more SCCs (e.g., the SCC 130).

As disclosed herein, a reputation database can be a distributed database located on multiple nodes within a network. The database may include, for example, filter rules, counters, etc., that can be used as part of a distributed process for providing network security.

In various embodiments described herein, a reputation database may include, for example, white lists and black lists. A white list can indicate that packets that correspond to an entry in the white list can be automatically forwarded, and a black list can indicate that packets that correspond to an entry in the black list can be automatically dropped. Thus, each entry in the white list can represent a filter rule (i.e., allow the corresponding packet) and each entry in the black list can represent a filter rule (i.e., drop the corresponding packet). Entries in the white lists or black lists can include, for example, rules associated with customer IDs, rules associated with SCC IDs, rules associated with FN or AFN IDs, rules associated with source IP addresses and subnet masks, rules associated with a destination IP addresses and subnet masks, rules associated with specific protocols (e.g., UDP, TCP, etc.) and ranges, rules associated with source IP ports and ranges, rules associated with destination IP ports and ranges, rules related to other packet properties (e.g., TTL, TCP SYN flag, etc.), rules related to packet size (e.g., SYN packets over 1024 bytes), etc. Other rules included in the reputation database can include, for example, rules that determine whether similar packets exceed a specific rate limit, and the like.

In some implementations, the end device 125 can represent one or more computing devices connected to the network 110. For example, the end device 125 can represent one or more webservers, databases, mainframe devices, personal computing devices (e.g., laptops, desktops, tablet computers, smartphones, internet-of-things (IOT) devices, etc.), or other computing devices. In additional embodiments, the end device 125 can be a computing device of an end user or application that is receiving, attempting to access, or transmitting a packet. As shown in FIG. 1, the end device 125 can be communicatively connected to the filter node 120. For example, the end device 125 can be physically connected to the filter node 120, and the filter node 120 can filter packets that could pose a threat to the end device 125 and/or other devices in the system 100 (e.g., packets that correspond to a DDOS attack).

In further implementations, the end device 140 can represent one or more computing devices connected to the network 110. For example, the end device 140 can represent one or more webservers, databases, mainframe devices, personal computing devices (e.g., laptops, desktops, tablet computers, smartphones, IOT devices, etc.), or other computing devices. In additional embodiments, the end device 140 can be a computing device of an end user or application that is receiving attempting to access, or transmitting a packet. As shown in FIG. 1, the end device 140 can be communicatively connected to the filter node 120 or the filter node 160 via the network 110. In some embodiments, one or more of the filter node 120 or the filter node 160 can filter packets that could pose a threat to the end device 140 and/or other devices in the system 100 (e.g., packets that correspond to a DDOS attack).

In some implementations, the application filter node 150 can represent one or more computing devices connected to the network 110. For example, the application filter node 150 can represent one or more webservers, databases, mainframe devices, personal computing devices (e.g., laptops, desktops, tablet computers, smartphones, IOT devices, etc.), or other computing devices. In additional embodiments, the application filter node 150 can include a hardware offload device 152 that can be, for example, one or more NICs with FPGAs (e.g., with accessory memory) that are capable of receiving reputation data (e.g., instructions to create filter rules), maintaining and updating an instance of a reputation database, receiving network traffic directed to one or more end devices (e.g., the end device 140), maintaining counters associated with one or more packet properties, determining whether to drop a packet based on the reputation database, determining whether to modify a packet based on the reputation database, creating filter rules, forwarding packets to applications and/or end devices, and transmitting reputation data to one or more SCCs (e.g., the SCC 130). In further embodiments, the application filter node 150 can include an application 154, where the application 154 can be an application capable of analyzing network packets, monitoring, recording, and reporting statistics associated with network traffic, creating and utilizing routing tables, transmitting network packets, receiving network packets, and performing other functions. The application 154 can be stored in and/or run using hardware components that are connected to the hardware offload 152 via, for example, a Peripheral Component Interconnect (PCI) bus (not shown). In some embodiments, the application filter node 150 can filter packets, using the hardware offload 152, that could pose a threat to the application filter node 150 or end devices (e.g., packets that correspond to a DDOS attack).

In some embodiments, the filter node 160 can represent one or more computing devices connected to the network 110 and the network 162. For example, the filter node 160 can represent one or more NICs, webservers, databases, mainframe devices, or other computing devices. In additional embodiments, the filter node 160 can be capable of receiving reputation data (e.g., instructions to create filter rules), maintaining and updating an instance of a reputation database, receiving network traffic directed to one or more end devices (e.g., the end device 164), receiving network traffic from one or more end devices, maintaining counters associated with one or more packet properties, determining whether to drop a packet based on the reputation database, forwarding packets to end devices, and transmitting reputation data to one or more SCCs (e.g., the SCC 130).

In some implementations, the end device 164 can represent one or more computing devices connected to the network 162. For example, the end device 164 can represent one or more webservers, databases, mainframe devices, personal computing devices (e.g., laptops, desktops, tablet computers, smartphones, IOT devices, etc.), or other computing devices. In additional embodiments, the end device 164 can be a computing device of an end user or application that is receiving and/or attempting to access a packet. As shown in FIG. 1, the end device 164 can be communicatively connected to the filter node 160 via the network 162. For example, the network 162 can be a local area network that connects multiple devices, including the filter node 160 and the end device 164, and the filter node 160 can filter packets that could pose a threat to the devices on the network 162 (e.g., packets that correspond to a DDOS attack), such as the end device 164.

In various embodiments, components of the system 100 can be part of a distributed security plane. The security plane can represent the interoperability of the devices in the tiered architecture of the system 100. For example, an SCC (e.g., the SCC 130) can be securely connected in the security plane to FNs (e.g., the filter node 120 and/or the filter node 160) and/or AFNs (e.g., the application filter node 150) to allow packet traffic to be bi-directionally filtered (e.g., allowed to be forwarded, modified, or dropped). In other words, FNs and AFNs can process packets transmitted to or from end devices (e.g., the end device 125, the end device 140, and/or the end device 160) and AFNs (e.g., the application filter node 150).

Within an SCC, reported reputation data from FNs and/or AFNs may be evaluated against various thresholds and rules using a variety of algorithms and other data to instruct FNs and/or AFNs how to process packets. Within the FNs and/or AFNs, network packets may be evaluated against various thresholds and rules using a variety of algorithms and other data to determine how to process the packet. Data handling of reputation data can occur within the security plane, which can include the SCCs and the hardware offload devices of the FNs and AFNs. Other data can be processed outside the security plane (e.g., in an application contained within the operating system of an AFN or in an application on an end device). In additional embodiments, the security plane may also use portions of operating systems within FNs and AFNs which communicate with hardware offload devices.

The system 100 described above is a simplified example of such a system that is presented for ease and clarity of explanation. In various embodiments, the system 100 can include additional end devices, SCCs, filter nodes, application filter nodes, networks, etc. Additionally, the system 100 can include other computer network entities or website entities, such as, for example, domain name registries, name servers, recursive name servers, internet service providers, website servers, etc.

Figure 2:
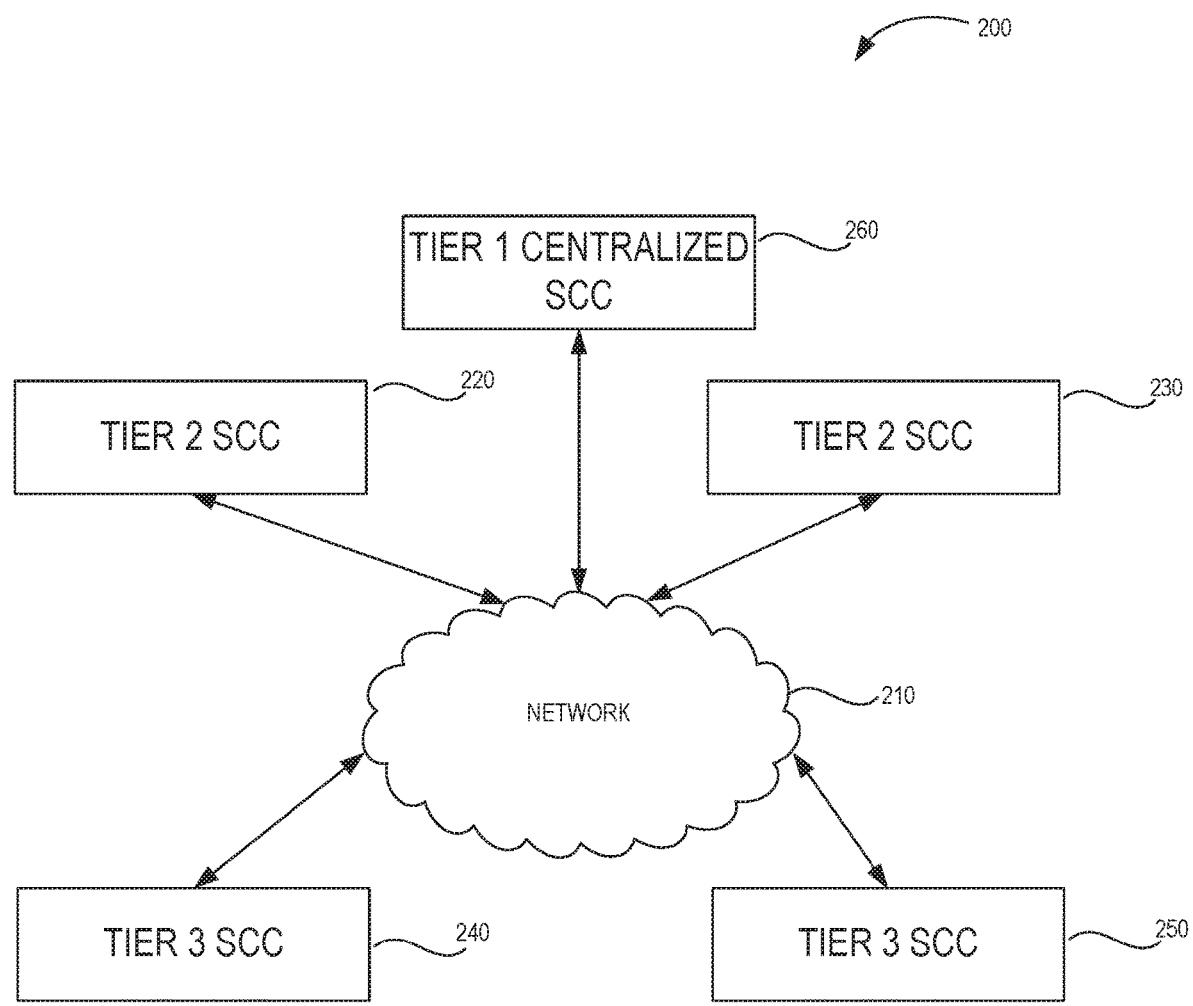
FIG. 2 is a diagram illustrating an example of a system for providing distributed security control with a centralized security control center, consistent with certain disclosed embodiments.

FIG. 2 is a diagram illustrating an example of a system 200 for providing distributed security control with a centralized security control center, consistent with certain disclosed embodiments. The system 200 can include a network 210, a tier 2 SCC 220, a tier 2 SCC 230, a tier 3 SCC 240, a tier 3 SCC 250, and a tier 1 centralized SCC 260.

In some implementations, the network 210 can represent one or more communication networks. For example, the network 210 can represent one or more wide area networks (e.g., the Internet), one or more local area networks, one or more telecommunications networks, and the like.

In further embodiments, the tier 2 SCC 220 and the tier 2 SCC 230 can each represent one or more computing devices. For example, the tier 2 SCC 220 and the tier 2 SCC 230 can each represent one or more web servers, databases, mainframe devices, or other computing devices. In additional embodiments, the tier 2 SCC 220 and the tier 2 SCC 230 can each be capable of receiving reputation data, maintaining an instance of a reputation database, creating filter rules, and transmitting reputation data. In some implementations, the tier 2 SCC 220 and the tier 2 SCC 230 can each represent a mid-tier SCC that can control lower-tier SCCs (e.g., tier 3, etc.) and can receive instructions from higher tier SCCs (e.g., tier 1). In further implementations, the tier 2 SCC 220 and/or the tier 2 SCC 230 may also prevent control by higher tier SCCs based on local rules (e.g., political or geographical rules).

In other embodiments, the tier 3 SCC 240 and the tier 3 SCC 250 can each represent one or more computing devices. For example, the tier 3 SCC 240 and the tier 3 SCC 250 can each represent one or more web servers, databases, mainframe devices, or other computing devices. In additional embodiments, the tier 3 SCC 240 and the tier 3 SCC 250 can each be capable of receiving reputation data, maintaining an instance of a reputation database, creating filter rules, and transmitting reputation data. In some implementations, the tier 3 SCC 240 and the tier 3 SCC 250 can each represent a low-tier SCC that can receive instructions from higher tier SCCs (e.g., tier 1 and tier 2). In further implementations, the tier 3 SCC 240 and/or the tier 3 SCC 250 may also prevent control by higher tier SCCs based on local rules (e.g., political or geographical rules).

In further embodiments, the tier 1 centralized SCC 260 can represent one or more computing devices. For example, the tier 1 centralized SCC 260 can represent one or more webservers, databases, mainframe devices, or other computing devices. In additional embodiments, tier 1 centralized SCC 260 can be capable of receiving reputation data, maintaining a centralized instance of a reputation database, creating filter rules, and transmitting reputation data. In some implementations, the tier 1 centralized SCC 260 can represent a high-tier SCC that can control lower-tier SCCs (e.g., tier 2, tier 3, etc.). In some embodiments, the tier 1 centralized SCC 260 may be the only tier 1 SCC in the system 200. In other embodiments, other tier 1 SCCs (not shown) may be used in the system 200 and each may maintain an instance of a reputation database that is distributed among the tier 1 SCCs. For example, each instance of the reputation database can be a copy of the other instances or each instance can include a subset of the complete reputation database.

In some embodiments, the tier 2 SCC 220 may transmit reputation data based on reputation data received from the tier 3 SCC 240 and other tier 3 SCCs associated with the tier 2 SCC 220. Additionally, the tier 2 SCC 220 may receive instructions to create filter rules from the tier 1 centralized SCC 260, store the filter rules in an instance of a reputation database on the tier 2 SCC 220, and forward the filter rules, as reputation data, to the tier 3 SCC 240 and other tier 3 SCCs associated with the tier 2 SCC 220. In further embodiments, the tier 2 SCC 220 may be a centralized SCC for a subsystem of the system 200, where the subsystem includes the tier 2 SCC 220 and any tier 3 or lower-tier SCC associated with the tier 2 SCC 220 (none shown). Each tier 3 or lower-tier SCC may send reputation data to and receive instructions from the tier 2 SCC 220, and the tier 2 SCC 220 may send some, but not all, of the received reputation data to the tier 1 centralized SCC 260. Accordingly, the reputation data that is maintained in the subsystem that includes the tier 2 SCC 220 may be different from the reputation data that is maintained in a subsystem that includes the tier 2 SCC 230.

The system 200 described above is a simplified example of such a system that is presented for ease and clarity of explanation. In various embodiments, the system 200 can include additional SCCs, networks, etc. Additionally, the system 200 can include other computer network entities or website entities, such as, for example, end devices, filter nodes, application filter nodes, domain name registries, name servers, recursive name servers, internet service providers, website servers, etc.

Figure 3:
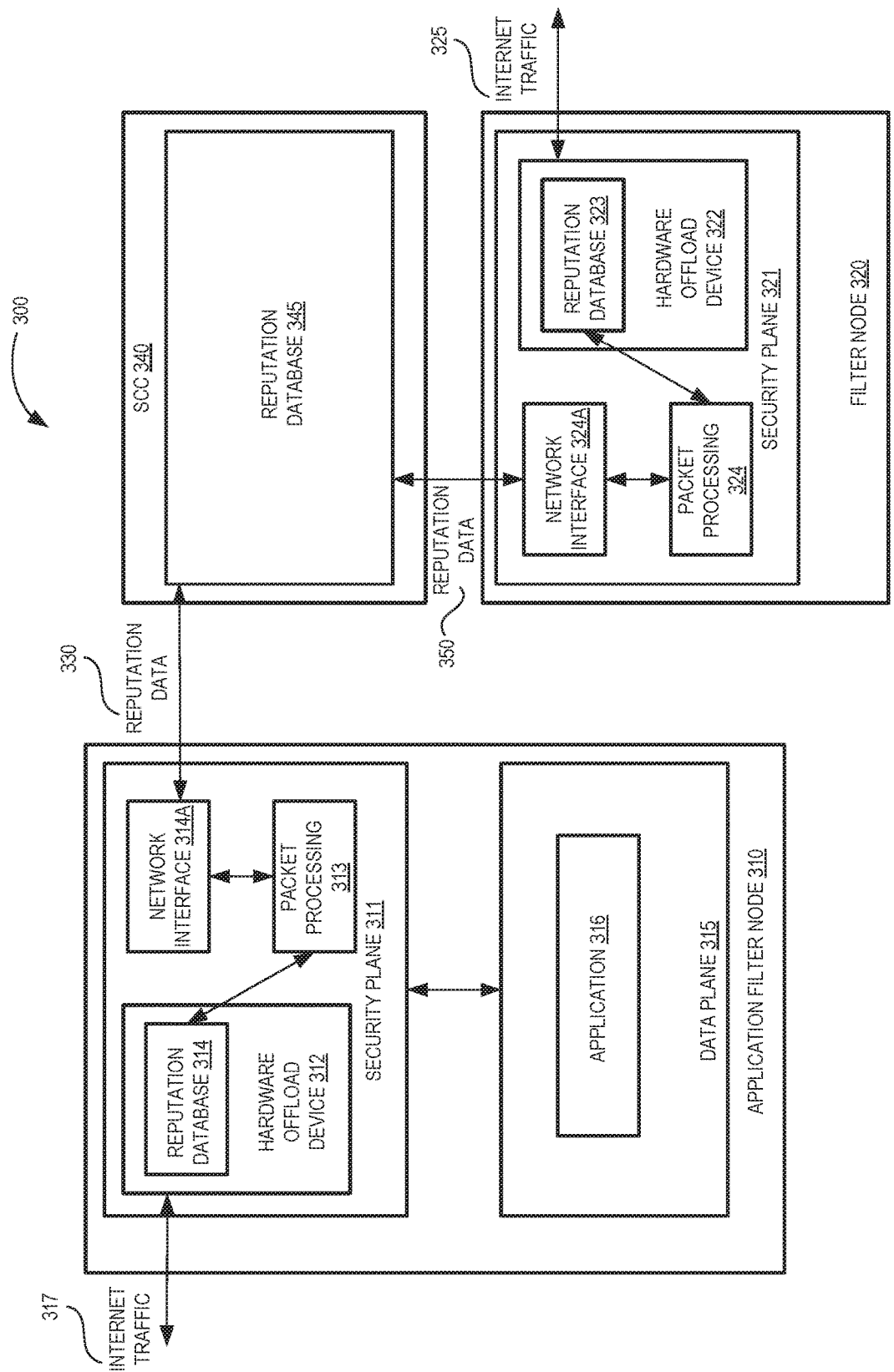
FIG. 3 is a diagram illustrating an example of a system for providing distributed security control using an application filter node and a filter node, consistent with certain disclosed embodiments.

FIG. 3 is a diagram illustrating an example of a system 300 for providing distributed security control using an application filter node and a filter node, consistent with certain disclosed embodiments. The system 300 can include an application filter node 310, a filter node 320, and an SCC 340.

In some implementations, the application filter node 310 can represent one or more computing devices that are communicatively connected to the SCC 340 (e.g., via one or more networks (not shown)) and that can send and receive internet traffic 317 (e.g., via one or more networks).

The application filter node 310 can include a hardware offload device 312 that can be, for example, one or more NICs with FPGAs. The hardware offload device 312 can operate in a security plane 311 of the application filter node 310, where the security plane 311 defines the part of the architecture of the application filter node 310 that maintains an instance of a reputation database 314, includes a network interface 314A, and includes packet processing logic 313. The packet processing logic 313 can process reputation data 330 and manage the reputation database 314. Additionally, the packet processing logic 313 may execute inside the hardware offload device 312 or using the compute resources of the application filter node 310. Within the security plane 311, the application filter node 310 can maintain and update the instance of the reputation database 314, receive and transmit the internet traffic 317 directed to one or more applications and/or end devices, receive and transmit the reputation data 330 from or to an SCC, maintain counters associated with one or more properties of packets in the internet traffic 317 (e.g., using the instance of the reputation database 314), and determine whether to drop or modify a packet (e.g., using the instance of the reputation database 314). In some embodiments, maintaining the instance of the reputation database 314 can be performed completely or partially using a NIC with a FPGA with accessory memory.

The application filter node 310 can include a network interface 314A (e.g., a NIC without a FPGA) that is capable of transmitting and receiving the reputation data 330 within the security plane 311. In some embodiments, the reputation data 330 can be received at the network interface 314A and then processed using the packet processing logic 313. For example, the reputation data 330 can be instructions to report reputation data to the SCC 340. Accordingly, the packet processing logic 313 can access the instance of the reputation database 314 on the hardware offload device 312 and then send the retrieved data to the SCC 340 via the network interface 314A. Additionally, the packet processing logic 313 can update the reputation database 314 based on instructions received in the reputation data 330. Accordingly, the application filter node 310 can receive the internet traffic 317 via the hardware offload device 312 and separately receive the reputation data 330 via the network interface 314A. Thus, if the hardware offload device 312 becomes consumed (e.g., during a DDOS attack), the application filter node 310 can still send and receive the reputation data 330.

If the application filter node 310 determines, within the security plane 311, to drop a packet, the application filter node 310 can, in some embodiments, within the security plane 311, record statistics regarding the dropped packet (e.g., in the instance of the reputation database 314).

Accordingly, packets that could pose a threat to the application filter node 310 or the system 300 (e.g., packets that correspond to a DDOS attack) can be removed, modified, discarded, or otherwise filtered in the security plane 311 without reaching the data plane 315 or a network connected to the application filter node 310.

If the application filter node 310 determines, within the security plane 311, not to drop a packet, the application filter node 310 can send the packet to or from the application 316 in the data plane 315 (e.g., via a PCI bus). In some implementations, the application 316 can be an intended destination of the packet, and the application 316 can perform an operation using the packet. In other implementations, the application 316 can determine how to route the packet using a routing table by, for example, looking up a destination address of the packet in the routing table and determining a path for forwarding the packet to its intended destination. In further implementations, the application 316 can be the source of the packet and may be attempting to transmit the packet to another device.

In some implementations, the filter node 320 can represent one or more computing devices that are communicatively connected to the SCC 340 (e.g., via one or more networks (not shown)) and can send and receive internet traffic 325 (e.g., via one or more networks).

In some embodiments, the filter node 320 can include a hardware offload device 322 that can be, for example, one or more NICs with FPGAs. The hardware offload device 322 can operate in a security plane 321 of the filter node 320, where the security plane 321 defines the part of the architecture of the filter node 320 that maintains an instance of a reputation database 323, includes a network interface 324A, and includes packet processing logic 324. The packet processing logic 324 can process reputation data 350 and manage the reputation database 323. Additionally, the packet processing logic 324 may execute inside the hardware offload device 322 or using the compute resources of the filter node 320. In other embodiments, the filter node 320 may not include a hardware offload device, and the main processor of the filter node 320 may operate in the security plane 321.

Within the security plane 321, the filter node 320 can maintain and update the instance of the reputation database 323, receive and transmit the internet traffic 325 directed to one or more applications and/or end devices, receive and transmit the reputation data 350 from or to an SCC, maintain counters associated with one or more properties of packets in the internet traffic 325 (e.g., using the instance of the reputation database 323), and determine whether to drop or modify a packet (e.g., using the instance of the reputation database 323). In some embodiments, maintaining the instance of the reputation database 323 can be performed completely or partially using a NIC with a FPGA with accessory memory and/or within the security plane 321.

The filter node 320 can include a network interface 324A (e.g., a NIC without a FPGA) that is capable of transmitting and receiving the reputation data 350 within the security plane 321. In some embodiments, the reputation data 350 can be received at the network interface 324A and then processed using packet processing logic 324. For example, the reputation data 350 can be instructions to report reputation data to the SCC 340. Accordingly, the packet processing logic 324 can access the instance of the reputation database 323 on the hardware offload device 322 and then send the retrieved data to the SCC 340 via the network interface 324A. Additionally, the packet processing logic 324 can update the reputation database 323 based on instructions received in the reputation data 350. Accordingly, the filter node 320 can receive the internet traffic via the hardware offload device 322 and separately receive the reputation data 350 via the network interface 324A. Thus, if the hardware offload device 322 becomes consumed (e.g., during a DDOS attack), the filter node 320 can still send and receive the reputation data 350.

If the filter node 320 determines, within the security plane 321, to drop a packet, the filter node 320 can, in some embodiments, within the security plane 321, record statistics regarding the dropped packet (e.g., in the instance of the reputation database 323).

If the filter node 320 determines, within the security plane 321, not to drop a packet, the filter node 320 can forward the packet to an intended destination of the packet.

Accordingly, packets that could pose a threat to the system 300 or to an end device communicatively connected to the filter node 320 (e.g., packets that correspond to a DDOS attack) can be removed, discarded, modified, or otherwise filtered in the security plane 321. Thus, the hardware offload device 322 can process and forward packets with little or no assistance from other processing resources (e.g., processing resources that perform the packet processing logic 324) of the filter node 320. Accordingly, components of the filter node 320, other than the hardware offload device 322, can include simpler and/or cheaper processing hardware because the processing hardware may only be used to provide operating systems, provide interfaces, process the reputation data 350, etc. for the filter node 320 and may not be used to process the internet traffic 325.

In further embodiments, the SCC 340, can represent one or more computing devices that are communicatively connected to the application filter node 310 and the filter node 320 via one or more networks. In other embodiments, the SCC 340 can be connected to additional application filter nodes or filter nodes (not shown). In some implementations, the SCC 340 can be capable of receiving and transmitting the reputation data 330 from or to the application filter node 310 and/or the reputation data 350 from or to the filter node 320 and be capable of storing reputation data in an instance of a reputation database 345. Additionally, the SCC 340 can be capable of transmitting reputation data to other SCCs (not shown), creating filter rules, and receiving reputation data.

The system 300 described above is a simplified example of such a system that is presented for ease and clarity of explanation. In various embodiments, the system 300 can include additional SCCs, filter nodes, application filter nodes, etc. Additionally, the system 300 can include other computer network entities or website entities, such as, for example, end devices, networks, domain name registries, name servers, recursive name servers, internet service providers, website servers, etc.

Figure 4:
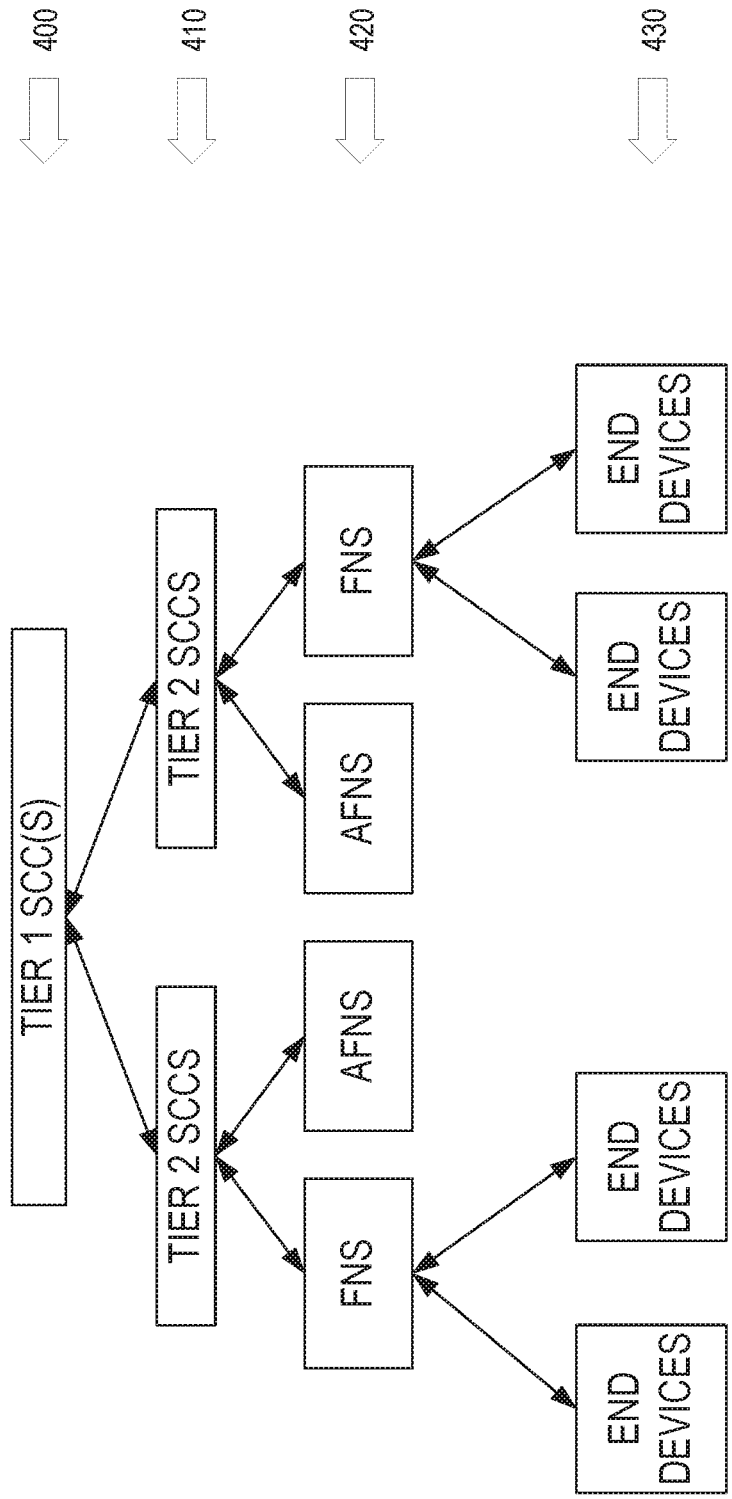
FIG. 4 is a diagram illustrating an example of a system architecture for providing distributed security control, consistent with certain disclosed embodiments.

FIG. 4 is a diagram illustrating an example of a system architecture for providing distributed security control, consistent with certain disclosed embodiments. The system architecture can include a hierarchy of devices, with one or more tier 1 SCCs 400 at a first level of the hierarchy, tier 2 SCCs 410 at a second level of the hierarchy, filter nodes and application filter nodes 420 at a third level (or lower) of the hierarchy, and end devices 430 at a fourth level (or lower) of the hierarchy.

In some embodiments, the one or more tier 1 SCCs 400 can be a single tier 1 SCC that includes a centralized instance of a reputation database and controls all other SCCs, filter nodes, and application filter nodes in the system with respect to the described reputation functionality. In other embodiments, the one or more tier 1 SCCs 400 can be multiple tier 1 SCCs that include distributed instances of a reputation database and control a subset of the SCCs, a subset of the filter nodes, and a subset of the application filter nodes in the system with respect to the described reputation functionality.

For example, if the system included two tier 1 SCCs, a first tier 1 SCC could control a first subset of the tier 2 SCCs and a second tier 1 SCC could control a second subset of the tier 2 SCCs. Together, the two tier 1 SCCs could control all of the tier 2 SCCs 410. Additionally, the first tier 1 SCC could communicate reputation data with the second tier 1 SCC. In some implementations, the first tier 1 SCC could share all of the reputation data in its instance of a reputation database with the second tier 1 SCC, and both tier 1 SCCs can maintain duplicate copies of the reputation database. In other implementations, the first tier 1 SCC could share some of the reputation data (e.g., global reputation data) with the second tier 1 SCC and not share other reputation data (e.g., local reputation data), and, thus, the instances of the reputation database maintained by the two tier 1 SCCs may be different.

As discussed above, controlling an SCC, a filter node, or an application filter node can include receiving reported reputation data from the device and sending reputation data (e.g., instructions to add or delete filter rules) to the device.

In some embodiments, the tier 2 SCCs 410 can be more than two tier 2 SCCs that include instances of a distributed reputation database and control a subset of the SCCs, a subset of the filter nodes, and/or a subset of the application filter nodes in the system.

For example, if the system included four tier 2 SCCs, a first tier 2 SCC could control a first subset of the FNs and AFNs, a second tier 2 SCC could control a second subset of the FNs and AFNs, a third tier 2 SCC could control a third subset of the FNs and AFNs, and a fourth tier 2 SCC could control a fourth subset of the FNs and AFNs. Together the four tier 2 SCCs could control all of the filter nodes and application filter nodes 420.

In some implementations, each tier 2 SCC could share all of the reputation data with the associated tier 1 SCC and only receive reputation data from the associated tier 1 SCC, and the tier 1 SCC and the tier 2 SCC can maintain duplicate copies of the reputation database. In other implementations, each tier 2 SCC could share some of the reputation data (e.g., global reputation data) with the associated tier 1 SCC and not share other reputation data (e.g., local reputation data), and, thus, the instances of the reputation database maintained by the tier 1 SCC and the tier 2 SCC may be different. Accordingly, reputation data sent to FNs and AFNs of one tier 2 SCC may be different from reputation data sent to FNs and AFNs of another tier 2 SCC.

In some embodiments, the filter nodes and application filter nodes 420 can be multiple filter nodes and application filter nodes that include instances of a distributed reputation database and receive, filter, modify, and/or route packets (e.g., packets sent to applications on AFNs or packets sent to the end devices 430).

In some implementations, each FN or AFN could share all of the reputation data with the associated tier 2 SCC and only receive reputation data from the associated tier 2 SCC, and the tier 2 SCC and the FN or AFN can maintain duplicate copies of the reputation database. In other implementations, each FN or AFN could share some of the reputation data (i.e., global reputation data) with the associated tier 2 SCC and not share other reputation data (i.e., local reputation data), and, thus, the instances of the reputation database maintained by the FN or AFN and the tier 2 SCC may be different. Accordingly, filter rules on one FN or AFN may be different from filter rules on another FN or AFN.

The system described above is a simplified example of such a system that is presented for ease and clarity of explanation. In various embodiments, the system architecture can include additional SCCs, additional tiers of SCCs (e.g., tier 3, tier 4, etc.), additional FNs or AFNs, etc. Additionally, the system can include other computer network entities or website entities.

Figure 5A:
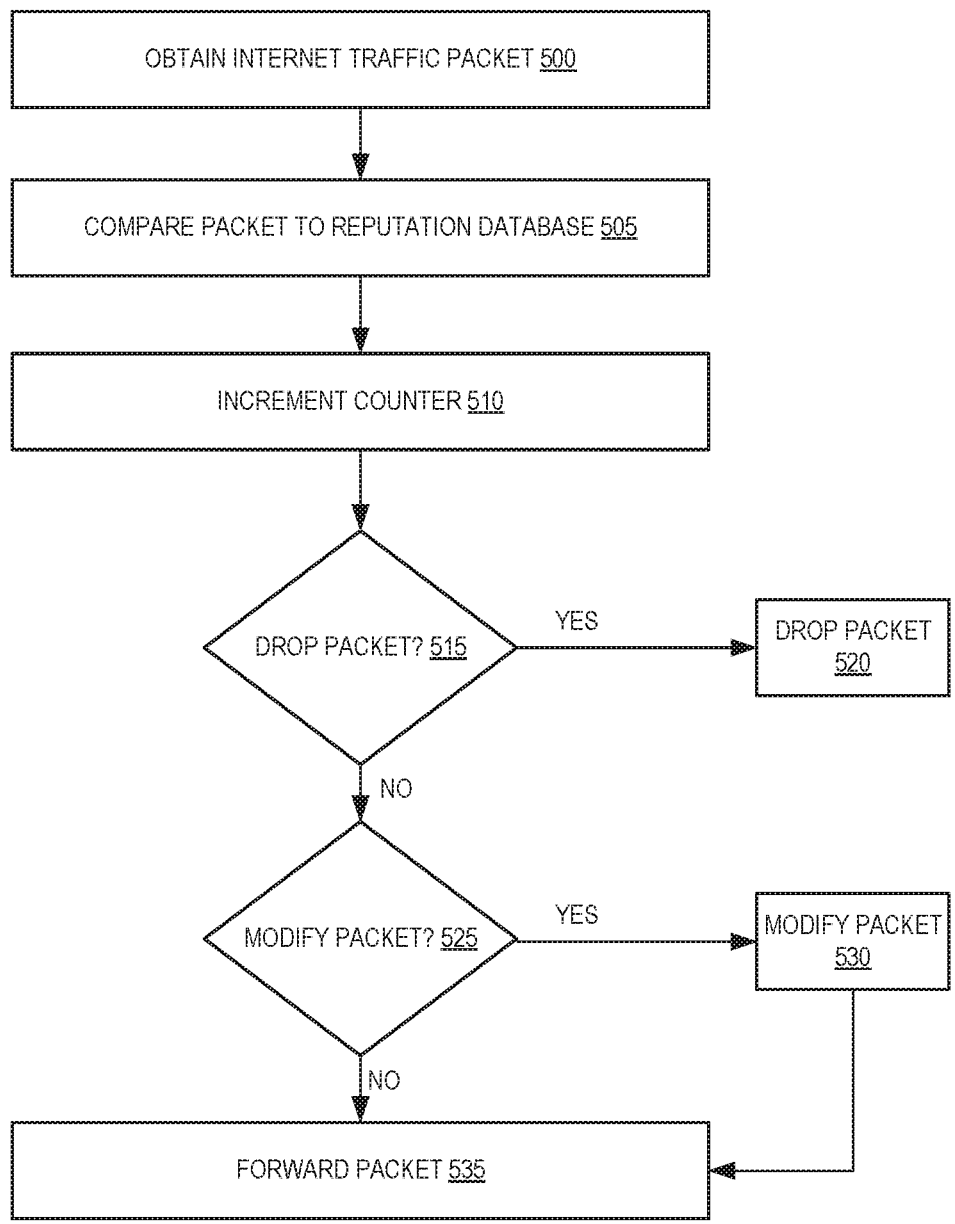
FIG. 5A is a flow diagram illustrating an example of a process for providing distributed security control, consistent with certain disclosed embodiments.

FIG. 5A is a flow diagram illustrating an example of a process for providing distributed security control, consistent with certain disclosed embodiments. In some embodiments, the method described in FIG. 5A can be performed using a computing device such as, for example, a webserver, a mainframe device, a personal computing device, a router, a NIC with a FPGA, etc.

In some implementations, the computing device can be, for example, a filter node, such as, for example, the filter node 120, the filter node 160, or the filter node 320 described above with regard to FIGS. 1 and 3. In other implementations, the computing device can be an application filter node, such as, for example, the application filter node 150 or the application filter node 310 described above with regard to FIGS. 1 and 3. Additionally, in some embodiments, the method described in FIG. 5A can be performed entirely or substantially within a security plane of the computing device and/or entirely or substantially using a hardware offload device (e.g., a NIC with an FPGA). For example, the process described with regard to FIG. 5A can be performed entirely using a hardware offload device (e.g., a NIC with an FPGA) of the computing device, while the process described with regard to FIG. 5B can be performed by the same computing device by receiving packets using a separate NIC (e.g., without an FPGA) and processing the packets using a different processor than used by the hardware offload device.

The process can begin in 500, when the computing device obtains a network packet. In some embodiments, the packet can be received from another device and can have an intended destination of a device other than the computing device, and the packet may have been intercepted by the computing device for the purpose of network security. In other embodiments, the packet can be received from another device and an application on the computing device can be the intended destination. In further embodiments, the packet can be generated by an application on the computing device and the application may be attempting to send the packet to another device.

In 505, the computing device can compare the packet to information in the instance of the reputation database. For example, the computing device can apply one or more filter rules in the instance of the reputation database to the packet (e.g., based on white and/or black lists), and the filter rules can indicate whether the packet should be dropped, modified, and/or allowed to continue through the network. As an example, a filter rule can drop the packet when a specified number of packets with the same destination address and/or the same source address are received within a specific time window, where the specified number of packets and the specific time window are indicative of malicious or undesirable network activity, such as a DOS attack.

In 510, the computing device can increment one or more counters associated with properties of the packet. In some embodiments, the computing device can maintain counters associated with, for example, source addresses (or parts thereof), destination addresses (or parts thereof), protocols, customer IDs, subnet masks, and combinations thereof. For example, a counter can be associated with a destination address and TCP, and the counter can be incremented when TCP packets with the destination address are received. In various implementations, the counters can be stored in the instance of the reputation database.

As an example, a counter can be an incremental counter associated with a time window. Accordingly, the counter can be incremented each time certain conditions are met (e.g., each time a packet associated with a particular source address is received). Additionally, the counter can be reset if a certain threshold number is not reached within the time window. Thus, such a counter could be used to, for example, identify a DOS attack by determining that a large number of packets are received from the same source or to identify a DDOS attack by determining that a large number of packets are being transmitted to the same destination.

In 515, the computing device can decide, identify, or otherwise determine whether to drop the packet. In some embodiments, the computing device can determine whether to drop the packet based on filter rules, counters, and the like as applied during the comparison at 505, where the rules, counters, and the like may be stored in the instance of the reputation database.

For example, if a counter reaches a certain threshold number within a time window, packets associated with the same parameters as the counter (e.g., same destination address, same source address, etc.) may be dropped.

If the computing device determines to drop the packet (515; YES), the process can proceed to 520 and the computing device may not forward the packet. Additionally, in various implementations, the computing device may delete the packet from memory.

If the computing device determines not to drop the packet (515; NO), the process can proceed to 525, and the computing device can determine whether to modify the packet. In some embodiments, the computing device can determine whether to modify the packet based on filter rules, counters, and the like applied during the comparison at 505, where the rules, counters, and the like may be stored in the instance of the reputation database.

If the computing device determines to modify the packet (525; YES), the process can proceed to 530 and the computing device can modify the packet. Packet modification may include bit by bit reassembly of the original packet to facilitate discovery of an attacking entity and/or mitigate an attack. As an example, packets can be modified to mitigate an attack by providing alternate destination IP addresses and null code for Structured Query Language (SQL) injection strings in received packets. As an additional example, packets can be modified to facilitate discovery of an attacking entity by receiving a packet, spoofing a response packet, and sending the response packet back to the attacking entity. A spoofed response packet may, for example, provide an incorrect acknowledgment to a received packet. Accordingly, the computing device can determine how sophisticated an attacker is based on how the attacking entity proceeds after receiving an incorrect acknowledgment.

Then, in 535, the computing device can forward the modified packet to an end device and/or application that is the intended destination.

If the computing device determines not to modify the packet (525; NO), the process can proceed to 535, and the computing device can forward the packet to an end device and/or application that is the intended destination. For example, if the computing device intercepted the packet, the computing device can forward the packet to its original destination address.

While the steps depicted in FIG. 5A have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 5B:
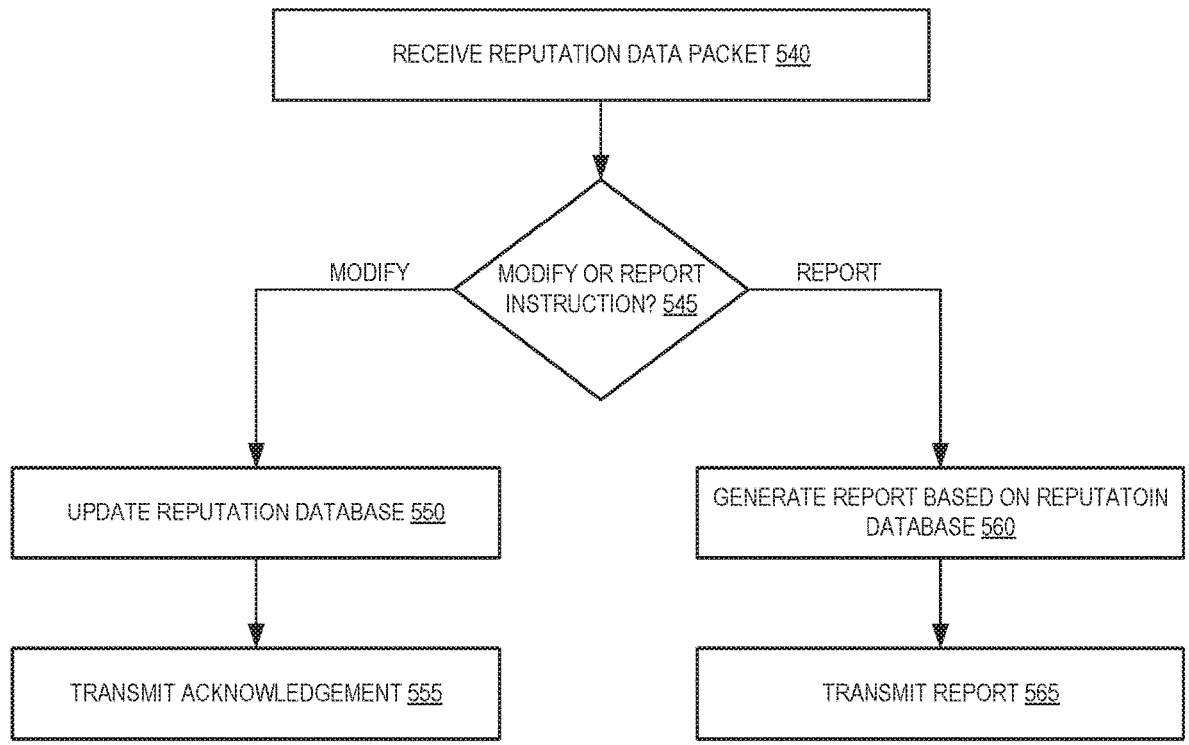
FIG. 5B is a flow diagram illustrating an example of a process for providing distributed security control, consistent with certain disclosed embodiments.

FIG. 5B is a flow diagram illustrating an example of a process for providing distributed security control, consistent with certain disclosed embodiments. In some embodiments, the method described in FIG. 5B can be performed using a computing device such as, for example, a webserver, a mainframe device, a personal computing device, a router, a NIC with a FPGA, etc.

In some implementations, the computing device can be, for example, a filter node, such as, for example, the filter node 120, the filter node 160, or the filter node 320 described above with regard to FIGS. 1 and 3. In other implementations, the computing device can be an application filter node, such as, for example, the application filter node 150 or the application filter node 310 described above with regard to FIGS. 1 and 3. Additionally, in some embodiments, the method described in FIG. 5B can be performed entirely or substantially within a security plane of the computing device. For example, the process described with regard to FIG. 5B can be performed by receiving packets using a NIC (e.g., without an FPGA) and processing the packets using a processor, while the process described with regard to FIG. 5A can be performed by the same computing device by using a hardware offload device (e.g., a NIC with an FPGA) of the computing device to process packets.

The process can begin in 540, when the computing device receives a reputation data packet. In some embodiments, the packet can be received from an SCC and include reputation data (e.g., instructions to add or delete a filter rule or instructions to transmit reputation data stored in the instance of the reputation database).

In some embodiments, the computing device can authenticate the packet by determining that, for example, a source address of the packet is an SCC associated with the computing device, the packet includes an SCC ID, and/or the packet includes authentication information for authenticating a source of the reputation data. If the packet cannot be authenticated, in various embodiments, the computing device may drop or otherwise delete the packet. If the packet is authenticated, the process can proceed to 545.

In 545, the computing device can determine whether the packet includes instructions to modify an instance of a reputation database on the computing device or instructions to generate a report of information in the instance of the reputation database.

In some embodiments, the instance of the reputation database can be part of a distributed reputation database that is distributed throughout a network (e.g., throughout the Internet). For example, instances of the reputation database can be distributed throughout the network, or, as a further example, the instance of the reputation database can include global reputation data and local reputation data that is unique to a subsystem within the system (e.g., a subsystem associated with a specific SCC).

In some embodiments, the instance of the reputation database can include filter rules that can be accessed by packet processing logic to determine whether to drop packets and/or when to report reputation data. In other embodiments, the instance of the reputation database can be stored within and accessed by a hardware offload device of the computing device.

If the computing device determines that the packet includes instructions to modify (545; MODIFY), the process can proceed to 550. In 550, the computing device can modify the reputation database based on the instructions in the reputation data. For example, if the received reputation data includes instructions to add or delete a filter rule, the computing device can update the instance of the reputation database accordingly.

In 555, the computing device can transmit an acknowledgement that the instance of the reputation database was updated to, for example, the SCC that sent the reputation data packet.

If the computing device determines that the packet includes instructions to report reputation data (545; REPORT), the process can proceed to 560.

In 560, the computing device can obtain corresponding information from the instance of the reputation database based on the instructions in the reputation data and generate a report. For example, the computing device can generate a report regarding rules, counters, or other data in the instance of the reputation database.

In 565, the computing device can transmit the report as reputation data packets to, for example, the SCC that sent the reputation data packet received in 540 and/or the SCC that is associated with the computing device.

While the steps depicted in FIG. 5B have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 6:
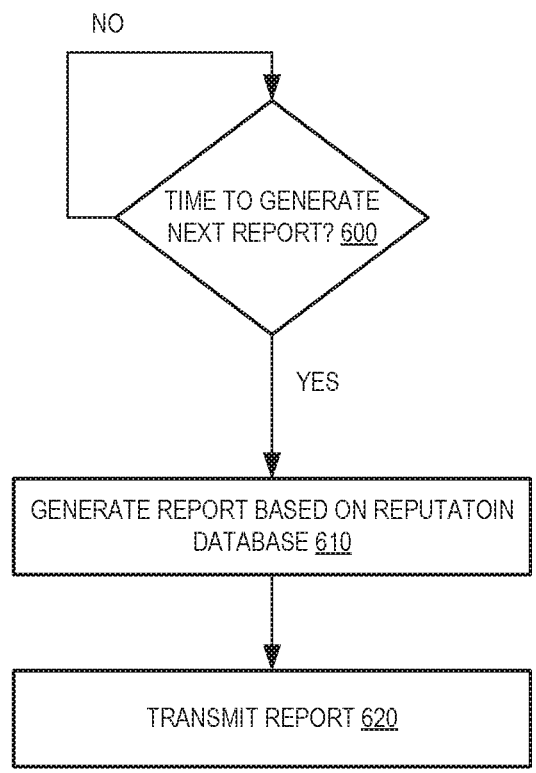
FIG. 6 is a flow diagram illustrating an example of a process for automatically reporting reputation data, consistent with certain disclosed embodiments.

FIG. 6 is a flow diagram illustrating an example of a process for automatically reporting reputation data, consistent with certain disclosed embodiments. In some embodiments, the method described in FIG. 6 can be performed using a computing device such as, for example, a webserver, a mainframe device, a personal computing device, a router, a NIC with a FPGA, etc.

In 600, the computing device can determine whether to generate a reputation database report based on a timer. For example, the computing device may receive instructions to generate a report every 24 hours from an SCC. Accordingly, the computing device can determine whether to generate a reputation database report based on a current time and a timestamp associated with the last report was transmitted.

If, in 600, it is not time to generate a report (600; NO), the computing device can loop back to 600 and determine whether it is time to generate a report at a subsequent time until it is time to generate a report (600; YES). When it is time to generate the next report, the process can proceed to 610.

In 610, the computing device can obtain information from an instance of the reputation database to generate a report. For example, the computing device can generate a report regarding rules, counters, or other data in the instance of the reputation database. In some embodiments, the obtained information and/or information included in the report can be information that has been updated since the last time a report was sent.

In 620, the computing device can transmit the report as reputation data packets to, for example, the SCC that is associated with the computing device.

While the steps depicted in FIG. 6 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 7:
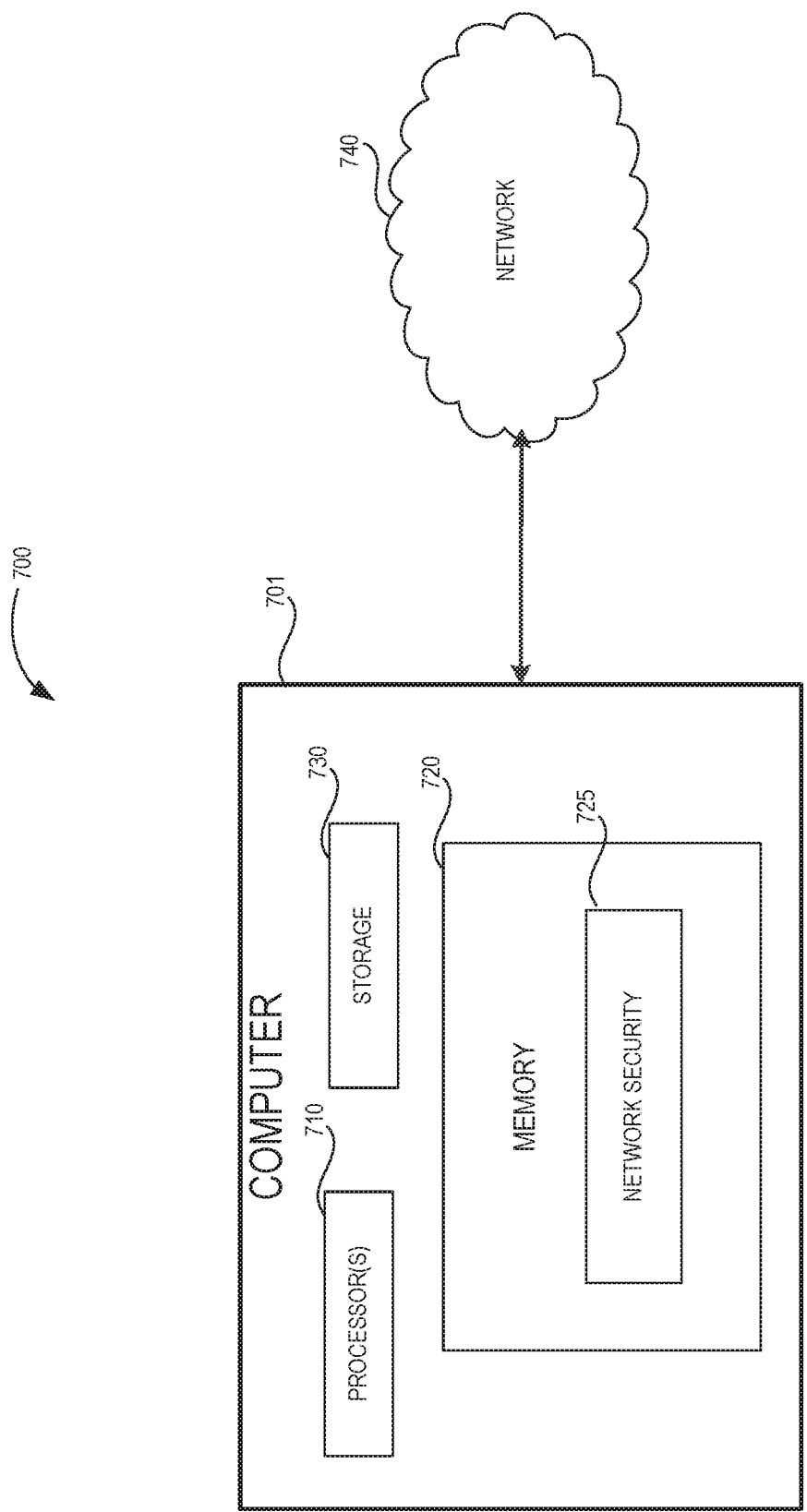
FIG. 7 is a diagram illustrating an example of a hardware system for providing improved security control, consistent with certain disclosed embodiments.

FIG. 7 is a diagram illustrating an example of a hardware system 700 for providing improved security control, consistent with certain disclosed embodiments. This example of the hardware system 700 includes specific examples of system components that may be used. The components and arrangement, however, may be varied.

A computer 701 may include a processor 710, a memory 720, a storage 730, and input/output (I/O) devices (not pictured). The computer 701 may be implemented in various ways and can be configured to perform any of the embodiments described above. In some embodiments, the computer 701 can be, for example, a desktop computer, a laptop, a tablet device, a mobile device (e.g., a smartphone), an IOT device, etc. In other embodiments, the computer 701 can be a computing device such as, for example, a database server, a web server, a website server, a mainframe computer, a distributed cluster of computing nodes and/or graphics processing units (GPUs), a router, a NIC with a FPGA, etc. In various embodiments, the computer 701 can be, for example, a filter node (e.g., the filter node 120), an application filter node (e.g., the application filter node 150), etc. The computer 701 may be standalone or may be part of a subsystem, which may, in turn, be part of a larger system.

The processor 710 may include one or more known processing devices, such as a microprocessor from the Intel Core™ family manufactured by Intel™, the Phenom™ family manufactured by AMD™, or the like. The memory 720 may include one or more storage devices configured to store information and/or instructions used by the processor 710 to perform certain functions and operations related to the disclosed embodiments. The storage 730 may include a volatile or non-volatile, magnetic, semiconductor, tape, optical, removable, non-removable, or other type of computer-readable medium used as a storage device. In some embodiments, the storage 730 can include, for example, an instance of a reputation database with filter rules and counters, etc.

In an embodiment, the memory 720 may include one or more programs or subprograms including instructions that may be loaded from the storage 730 or elsewhere that, when executed by the processor 710, perform various procedures, operations, or processes consistent with disclosed embodiments. For example, the memory 720 may include a network security program 725 for filtering packets, routing packets, accessing or updating an instance of a reputation database, incrementing counters, reporting reputation data, creating filter rules, etc., according to various disclosed embodiments. The memory 720 may also include other programs that perform other functions, operations, and processes, such as programs that provide communication support, Internet access, etc. The network security program 725 may be embodied as a single program, or alternatively, may include multiple sub-programs that, when executed, operate together to perform the function of the network security program 725 according to disclosed embodiments. In some embodiments, the network security program 725 can perform all or part of the processes of FIGS. 5-6, described above.

The computer 701 may communicate over a link with a network 740. For example, the link may be a direct communication link, a local area network (LAN), a wide area network (WAN), or other suitable connection. The network 740 may include the internet, as well as other networks, which may be connected to various systems and devices.

The computer 701 may include one or more input/output (I/O) devices (not pictured) that allow data to be received and/or transmitted by the computer 701. I/O devices may also include one or more digital and/or analog communication I/O devices that allow the computer 701 to communicate with other machines and devices. I/O devices may also include input devices such as a keyboard or a mouse, and may include output devices such as a display or a printer. The computer 701 may receive data from external machines and devices and output data to external machines and devices via I/O devices. The configuration and number of input and/or output devices incorporated in I/O devices may vary as appropriate for various embodiments.

Examples of uses of the system 700 can be described by way of example with reference to the embodiments described above.

While the teachings have been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
    a processor; and
    a computer-readable medium, wherein the processor and the computer-readable medium are included in a network interface card, and wherein the computer-readable medium contains instructions that, when executed by the processor, cause the processor to perform operations comprising:
        receiving a first network packet;

applying a first filter rule in a first instance of a distributed reputation database to the first network packet;
determining to drop the first network packet based on the applying the first filter rule;
transmitting reputation data to a security control center that comprises a second instance of the distributed reputation database, wherein the reputation data comprises information corresponding to the first network packet that was dropped;
receiving a second network packet;
applying a second filter rule in the first instance of the distributed reputation database to the second network packet;
determining to forward the second network packet to an intended destination of the second network packet based on the applying the second filter rule; and
forwarding the second network packet to the intended destination of the second network packet.

2. The system of claim 1, wherein the network interface card includes a field programmable gate array.

3. The system of claim 2, wherein the first instance of the distributed reputation database is stored in an accessory memory of the field programmable gate array.

4. The system of claim 1, wherein the network interface card operates in a security plane of the system.

5. The system of claim 4, wherein the operations further comprise:
receiving a third network packet;
applying a third filter rule in the first instance of the distributed reputation database to the third network packet;
determining, in the security plane, to modify the third network packet based on the applying the third filter rule;
modifying the third network packet; and
forwarding the third network packet that was modified to an intended destination of the third network packet.

6. The system of claim 1, wherein the operations further comprise sending the second network packet to an application in a data plane of the system via a Peripheral Component Interconnect (PCI) bus.

7. The system of claim 1, wherein the second network packet is received from an application in a data plane of the system via a Peripheral Component Interconnect (PCI) bus.

8. The system of claim 1, wherein the operations further comprise incrementing a counter corresponding to a property of the first network packet, wherein the reputation data transmitted to the security control center comprises an indication of the counter.

9. The system of claim 1, wherein the applying the first filter rule indicates that the first network packet is associated with a denial-of-service attack or a distributed denial-of-service attack.

10. The system of claim 1, wherein the operations further comprise receiving a third network packet comprising second reputation data, wherein:
the second reputation data comprises second instructions to transmit the reputation data to the security control center; and
the transmitting the reputation data is performed in response to the second instructions.

11. The system of claim 1, wherein the operations further comprise receiving a third network packet comprising second reputation data, wherein the second reputation data comprises second instructions to add a third filter rule or delete the third filter rule in the first instance of the distributed reputation database.

12. The system of claim 1, wherein:
the security control center is at a second tier in a hierarchy of devices;
the security control center transmits the reputation data to a second security control center at a first tier in the hierarchy of devices; and
the second security control center comprises a centralized instance of the distributed reputation database and controls the security control center.

13. The system of claim 1, further comprising a filter node communicatively coupled to the security control center over a network, wherein the processor, the computer readable medium, and the first instance of the distributed reputation database are present in the filter node.

14. A method comprising:
receiving a first network packet;
applying a first filter rule in a first instance of a distributed reputation database to the first network packet;
determining, using a processor included with a network interface component, to drop the first network packet based on the applying the first filter rule;
transmitting reputation data to a security control center that comprises a second instance of the distributed reputation database, wherein the reputation data comprises information corresponding to the first network packet that was dropped;
receiving a second network packet;
applying a second filter rule in the first instance of the distributed reputation database to the second network packet;
determining to forward the second network packet to an intended destination of the second network packet based on the applying the second filter rule; and
forwarding the second network packet to the intended destination of the second network packet.

15. The method of claim 14, wherein the network interface component comprises a network interface card that includes a field programmable gate array.

16. The method of claim 15, wherein the first instance of the distributed reputation database is stored in an accessory memory of the field programmable gate array.

17. The method of claim 15, wherein the network interface card operates in a security plane of a system that performs the method.

18. The method of claim 17, further comprising:
receiving a third network packet;
applying a third filter rule in the first instance of the distributed reputation database to the third network packet;
determining, in the security plane, to modify the third network packet based on the applying the third filter rule;
modifying the third network packet; and
forwarding the third network packet that was modified to an intended destination of the third network packet.

19. The method of claim 14, wherein the applying the first filter rule indicates that the first network packet is associated with a denial-of-service attack or a distributed denial-of-service attack.

20. The method of claim 14, further comprising receiving a third network packet comprising second reputation data, wherein the second reputation data comprises instructions to add a third filter rule or delete the third filter rule in the first instance of the distributed reputation database.

21. The method of claim 14, wherein:
the security control center is at a second tier in a hierarchy of devices;
the security control center transmits the reputation data to a second security control center at a first tier in the hierarchy of devices; and
the second security control center comprises a centralized instance of the distributed reputation database and controls the security control center.

22. A non-transitory computer readable storage medium comprising instructions for causing at least one processor included with a network interface component to:
receive a first network packet;
apply a first filter rule in a first instance of a distributed reputation database to the first network packet;
determine to drop the first network packet based on the applying the first filter rule;
transmit reputation data to a security control center that comprises a second instance of the distributed reputation database, wherein the reputation data comprises information corresponding to the first network packet that was dropped;
receiving a second network packet;
applying a second filter rule in the first instance of the distributed reputation database to the second network packet;
determining to forward the second network packet to an intended destination of the second network packet based on the applying the second filter rule; and
forwarding the second network packet to the intended destination of the second network packet.

23. The non-transitory computer readable storage medium of claim 22, wherein the network interface component comprises a network interface card that includes a field programmable gate array.

24. The non-transitory computer readable storage medium of claim 23, wherein the first instance of the distributed reputation database is stored in an accessory memory of the field programmable gate array.

25. The non-transitory computer readable storage medium of claim 23, wherein the network interface card operates in a security plane of a system that comprises that non-transitory computer readable storage medium.

26. The non-transitory computer readable storage medium of claim 25, further comprising instructions for causing the at least one processor included with the network interface component to:
receive a third network packet;
apply a third filter rule in the first instance of the distributed reputation database to the third network packet;
determine, in the security plane, to modify the third network packet based on the applying the third filter rule in the first instance of the distributed reputation database to the third network packet;
modify the third network packet; and
forward the third network packet that was modified to an intended destination of the third network packet.

27. The non-transitory computer readable storage medium of claim 22, wherein applying the first filter rule in the first instance of the distributed reputation database to the first network packet indicates that the first network packet is associated with a denial-of-service attack or a distributed denial-of-service attack.

28. The non-transitory computer readable storage medium of claim 22, further comprising instructions for causing the at least one processor included with the network interface component to receive a third network packet comprising second reputation data, wherein the second reputation data comprises instructions to add a third filter rule or delete the third filter rule in the first instance of the distributed reputation database.

29. The non-transitory computer readable storage medium of claim 22, wherein:
the security control center is at a second tier in a hierarchy of devices;
the security control center transmits the reputation data to a second security control center at a first tier in the hierarchy of devices; and
the second security control center comprises a centralized instance of the distributed reputation database and controls the security control center.

* * * * *